(12) United States Patent
Ueda

(10) Patent No.: US 11,037,302 B2
(45) Date of Patent: Jun. 15, 2021

(54) MOTION VIDEO SEGMENTING METHOD, MOTION VIDEO SEGMENTING DEVICE, AND MOTION VIDEO PROCESSING SYSTEM

(71) Applicant: PANASONIC INTELLECTUAL PROPERTY MANAGEMENT CO., LTD., Osaka (JP)

(72) Inventor: Junko Ueda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 88 days.

(21) Appl. No.: 16/095,441

(22) PCT Filed: Feb. 15, 2017

(86) PCT No.: PCT/JP2017/005493
§ 371 (c)(1),
(2) Date: Oct. 22, 2018

(87) PCT Pub. No.: WO2017/187723
PCT Pub. Date: Nov. 2, 2017

(65) Prior Publication Data
US 2019/0130584 A1 May 2, 2019

(30) Foreign Application Priority Data

Apr. 28, 2016 (JP) .............................. JP2016-091524

(51) Int. Cl.
*G06T 7/215* (2017.01)
*G06T 7/20* (2017.01)
(Continued)

(52) U.S. Cl.
CPC .......... *G06T 7/215* (2017.01); *G06K 9/00724* (2013.01); *G06T 7/11* (2017.01);
(Continued)

(58) Field of Classification Search
CPC ....... G06K 9/00724; G06T 7/11; G06T 7/194; G06T 7/20; G06T 7/215; H04N 21/23418; H04N 21/8456; H04N 5/225; H04N 5/91
See application file for complete search history.

(56) References Cited

U.S. PATENT DOCUMENTS 8,358,342 B2 * 1/2013 Park .................. G06K 9/00771
348/143
10,834,465 B1 * 11/2020 Kansara ........... H04N 21/23418
(Continued)

FOREIGN PATENT DOCUMENTS

CN          105208402 A  * 12/2015
JP          2007-036538      2/2007
(Continued)

OTHER PUBLICATIONS

Counting Crowded Moving Objects, Vincent Rabaud and Serge Belongie, Department of Computer Science and Engineering University of California, San Diego.*
(Continued)

*Primary Examiner* — Charles T Shedrick
(74) *Attorney, Agent, or Firm* — Greenblum & Bernstein, P.L.C.

(57) ABSTRACT

To provide a motion video segmenting method, a motion video segmenting device, and a motion video processing system that increase accuracy of motion video analysis performed by segmenting a motion video. A difficulty degree of each image configuring a pack is determined, and in a case where an image of a difficulty degree of Low continues for a predetermined value F_cnt or more, a motion video is segmented with an image one before a last of consecutive images to form a pack.

16 Claims, 11 Drawing Sheets

(51) Int. Cl.
  *H04N 5/225* (2006.01)
  *H04N 5/91* (2006.01)
  *G11B 27/10* (2006.01)
  *H04N 21/234* (2011.01)
  *H04N 21/845* (2011.01)
  *G06T 7/194* (2017.01)
  *G06T 7/11* (2017.01)
  *G06K 9/00* (2006.01)

(52) U.S. Cl.
  CPC ............ *G06T 7/194* (2017.01); *G06T 7/20* (2013.01); *G11B 27/10* (2013.01); *H04N 5/225* (2013.01); *H04N 5/91* (2013.01); *H04N 21/23418* (2013.01); *H04N 21/8456* (2013.01)

(56) References Cited

U.S. PATENT DOCUMENTS

| | | | |
|---|---|---|---|
| 2007/0024709 A1 | 2/2007 | Osada | |
| 2014/0111542 A1* | 4/2014 | Wan | G06K 9/3258 345/633 |
| 2015/0177829 A1* | 6/2015 | Sakuta | G02B 27/017 345/156 |
| 2015/0189222 A1 | 7/2015 | John et al. | |
| 2016/0057354 A1* | 2/2016 | Shigemura | G06K 9/00838 348/148 |
| 2016/0086029 A1* | 3/2016 | Dubuque | G06K 9/4614 382/159 |
| 2016/0125235 A1* | 5/2016 | Gu | G06T 7/215 382/103 |
| 2019/0130584 A1* | 5/2019 | Ueda | G06T 7/194 |
| 2019/0392586 A1* | 12/2019 | Ueda | H04N 21/8456 |

FOREIGN PATENT DOCUMENTS

| | | | |
|---|---|---|---|
| JP | 2010-016878 | 1/2010 | |
| JP | 2011-221920 | 11/2011 | |
| WO | WO-2017183270 A1 * | 10/2017 | ......... H04N 21/8456 |

OTHER PUBLICATIONS

Learning To Count Objects in Images, Victor Lempitsky and Andrew Zisserman.*
The Extended European Search Report dated Mar. 6, 2019 for European Patent Application No. 17789012.6.
Tanabiki et al., "Sports Video Analysis Solution", Panasonic Technical Journal, vol. 61, No. 2, Nov. 2015, pp. 78-83.
Official Communication issued in International Pat. Appl. No. PCT/JP2017/005493, dated Apr. 25, 2017.

* cited by examiner

FIG. 8

| RATE OF D_level : HIGH | LOAD VALUE |
|---|---|
| 0 | 1 |
| LARGER THAN 0 AND LESS THAN 0.25 | 2 |
| 0.25 OR MORE AND LESS THAN 0.5 | 3 |
| 0.5 OR MORE AND LESS THAN 0.75 | 4 |
| 0.75 OR MORE AND 1 OR LESS | 5 |

FIG. 9

| LENGTH OF PACK (RATE) | LOAD VALUE |
|---|---|
| UPTO 1 | 1 |
| 1 TO 1.5 | 2 |
| 1.5 TO 2 | 3 |
| 2 OR MORE | 4 |

# MOTION VIDEO SEGMENTING METHOD, MOTION VIDEO SEGMENTING DEVICE, AND MOTION VIDEO PROCESSING SYSTEM

TECHNICAL FIELD

The present disclosure relates to a motion video segmenting method, a motion video segmenting device, and a motion video processing system that perform processing on a motion video such as a sports video.

BACKGROUND ART

In recent years, tracking of position information of a player or a ball through a game is performed, a posture analysis, a behavior analysis, tracking of a position, and the like for each player are performed, and they are fed back to tactics of training or a next game for example, based on a sports motion video such as soccer.

In a case where a person manually analyzes many images configuring a motion video, much labor, time, or hand is required. Therefore, for example, NPL 1 discloses a sports video analysis system in which image analysis processing is automatically performed by a computer and in a case where the computer is erroneous, correction is accepted by the hand of a person, so that the analysis can be immediately performed and labor of a person can be reduced.

CITATION LIST

Non Patent Literature

NPL 1: Masamoto Tanabiki, and five others, "Sports Video Analysis Solution", Panasonic Technical Journal Vol. 61 No. 2 November 2015, p. 78-83

SUMMARY OF THE INVENTION

In the technique disclosed in NPL 1, the motion video is segmented into files at predetermined times, image analysis is performed on each file which is segmented by the computer, corrections are performed by a plurality of correctors to each segmented file for which the image analysis is performed, and then the segmented files are joined. The image analysis performed by the computer includes, for example, a process of tracking positions of a player, a ball, and the like, a process of detecting a posture of the player, and the like. In the technique disclosed in NPL 1, times required for the image analysis processing and the correction thereof are reduced by such an operation.

However, for example, in an image in which the players are densely imaged, it is more difficult for the computer to specify the position of the player or the ball by the image analysis than an image in which the players are scatteredly imaged, and there are cases where an error of a position specified result by the computer increases. The image in which the players are densely imaged may be continuous for several frames to several tens of frames. In NPL 1, since the motion video is segmented at a predetermined time, the motion video may be segmented before and after the image in which the image analysis is difficult.

In NPL 1, in the segmented files, information of the positions of the player and the ball are overlapped as a result of the image analysis by the computer and the correction by the corrector. When the segmented files are joined, the same player is specified and the position information of the same player is connected before and after a joining place. Therefore, in a case where images before and after the joining are images that are difficult to be the image analysis by the computer, that is, are images in which the players are densely imaged, there is a problem that the accuracy of joining of a tracking result in which (1) the accuracy of the position information before and after the joining place decreases and (2) the accuracy of specifying the same player at the time of joining. That is, in the related art, there is a problem that the accuracy of the motion video analysis which is performed by segmenting the motion video decreases.

The present disclosure provides a motion video segmenting method, a motion video segmenting device, and a motion video processing system that increase accuracy of motion video analysis performed by segmenting a motion video.

The present disclosure provides a motion video segmenting method in which a processor segments images of a plurality of frames configuring a motion video into a plurality of groups, the method including: by the processor, determining a difficulty degree of performing an editing operation of the images based on a feature amount obtained from the image; and determining a place at which the images of the plurality of frames configuring the motion video are segmented into the plurality of groups based on the calculated difficulty degree of the image.

According to the disclosure, it is possible to increase the accuracy of motion video analysis performed by segmenting the motion video.

BRIEF DESCRIPTION OF DRAWINGS

FIG. 8 is a diagram illustrating a first example of a setting method of a load value.

FIG. 9 is a diagram illustrating a second example of a setting method of a load value.

DESCRIPTION OF EMBODIMENTS

Hereinafter, embodiments will be appropriately described with reference to the drawings. However, detailed description may be omitted more than necessary. An unnecessarily detailed explanation is, for example, a detailed explanation of already well known matters, a duplicate explanation for substantially the same configuration, or the like. This is to avoid the unnecessary redundancy of the following description and to facilitate understanding by those skilled in the art.

It should be understood that the following description and the drawings referred to are provided to enable those skilled in the art to understand the present disclosure and thereby they are not intended to limit the gist described in the claims.

Embodiment 1

[1.1 Configuration]

Figure 1:
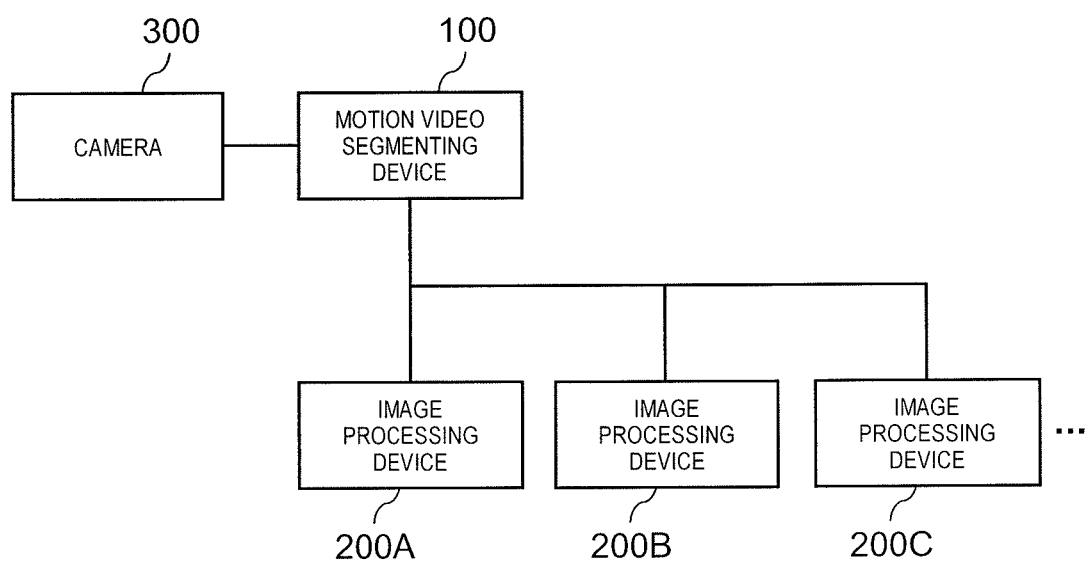
FIG. 1 is a diagram illustrating an example of a configuration of a motion video processing system.

FIG. 1 is a diagram illustrating an example of a configuration of motion video processing system 1. As illustrated in FIG. 1, motion video processing system 1 includes motion video segmenting device 100, a plurality of image processing devices 200A, 200B, 200C, . . . , and camera 300. Motion video segmenting device 100 and camera 300, and motion video segmenting device 100 and the plurality of image processing devices 200A, 200B, 200C, are connected so as to be capable of communicating to each other. Hereinafter, the plurality of image processing devices 200A, 200B, 200C, may be described as image processing device 200.

Figure 2:
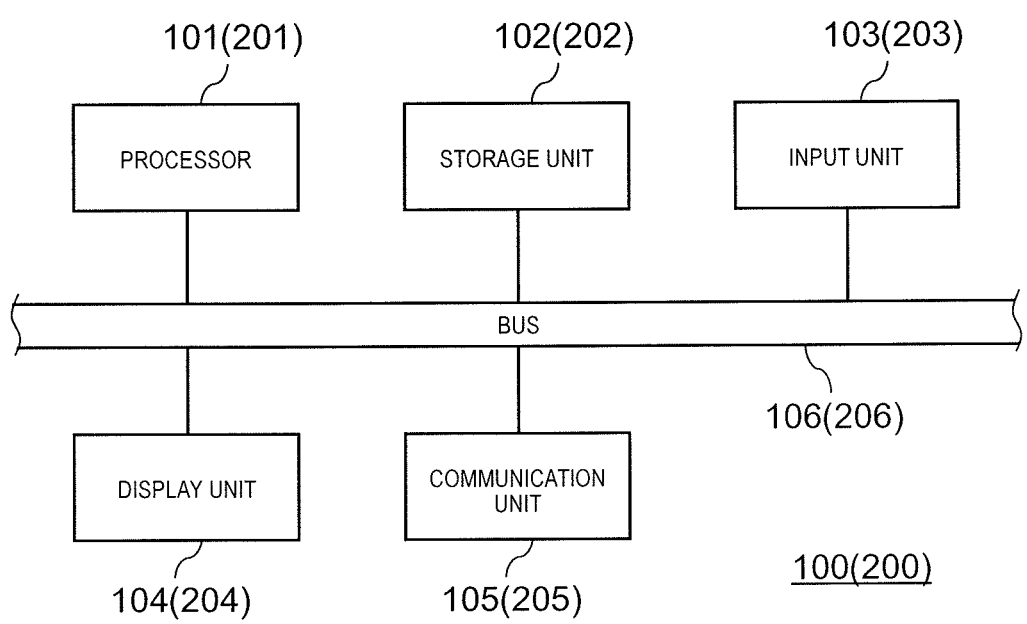
FIG. 2 is a diagram illustrating an example of a configuration of a motion video segmenting device (or an image processing device).

Motion video segmenting device 100 and image processing device 200 are configured by, for example, computers such as PCs and workstations. FIG. 2 is a diagram illustrating an example of a configuration of motion video segmenting device 100 (or image processing device 200). As illustrated in FIG. 2, motion video segmenting device 100 (or image processing device 200) includes processor 101 (201), storage unit 102 (202), input unit 103 (203), display unit 104 (204), communication unit 105 (205), and bus 106 (206).

Processor 101 (201) performs calculation so as to control configuration elements other than motion video segmenting device 100 (or image processing device 200).

Storage unit 102 (202) temporarily or permanently stores information. Storage unit 102 (202) corresponds to a Read Only Memory (ROM), a Random Access Memory (RAM), or the like of motion video segmenting device 100 (or image processing device 200). In the example illustrated in FIG. 2, motion video segmenting device 100 (or image processing device 200) has only one storage unit 102 (202), but may have a plurality of storage units 102 (202) if necessary. Storage unit 102 (202) may be configured of, for example, a Hard Disk Drive (HDD), a Synchronous Dynamic Random Access Memory (SDRAM), a Solid State Drive (SSD), or the like.

Input unit 103 (203) accepts an input from an outside. Input unit 103 (203) may be configured by, for example, an input device such as a mouse, a keyboard, or a trackball.

Display unit 104 (204) displays information to the outside. Display unit 104 (204) may be configured by, for example, a display device such as a liquid crystal display or an organic EL display.

Communication unit 105 (205) transmits and receives information to and from the outside. Communication unit 105 (205) may be configured by, for example, a communication interface such as a communication port or a wireless communication device. Motion video segmenting device 100 can transmit and receive information to and from image processing device 200 via communication unit 105. In addition, image processing device 200 can transmit and receive information to and from motion video segmenting device 100 via communication unit 205.

Bus 106 (206) is a path for connecting each element configuring motion video segmenting device 100 (or image processing device 200). Bus 106 (206) can be configured inside processor 101 (201) by combining bus 106 (206) with processor 101 (201). Bus 106 (206) may be connected by wire to each element or may be connected wirelessly to each element.

The configuration of motion video segmenting device 100 (or image processing device 200) which is described above is an example. Therefore, motion video segmenting device 100 (or image processing device 200) may be configured by adding another configuration element to the configuration described above. In addition, motion video segmenting device 100 (or image processing device 200) may be configured by deleting a part of a configuration element from the configuration described above if necessary. In addition, motion video segmenting device 100 (or image processing device 200) may be configured by combining the configuration elements described above with each other. In addition, motion video segmenting device 100 (or image processing device 200) may be configured by a part of the configuration elements described above.

Camera 300 photographs an object to be photographed, generates an image, and transmits the image to motion video segmenting device 100. In motion video processing system 1 of the disclosure, the image photographed by camera 300 is a motion video, for example, including 30 frames per second, that is, 30 still images per one second.

[1.2 Operation]

Next, an operation of motion video processing system 1 in Embodiment 1 will be described. In the following description, the operation of motion video segmenting device 100 is mainly performed by processor 101 in cooperation with respective other configuration elements of motion video segmenting device 100.

Motion video processing system 1 tracks a position of a player, a sports equipment (ball or the like), or the like reflected in the motion video based on a sports video configured by the motion video of the sports event photographed by camera 300. In the disclosure, for example, the sports event is supposed to be one in which a plurality of players play at the same time, such as soccer or American football but, for example, may be one in which one player plays at one time such as golf.

The sports video may be configured by a motion video which is photographed by one camera 300, or may be configured by joining motion videos photographed by a plurality of cameras 300. Particularly, in a case where a game with a wide field such as soccer is photographed, it is desirable to join the motion videos photographed by the plurality of cameras 300. A technique for combining the motion videos is not particularly limited in the disclosure.

Figure 3:
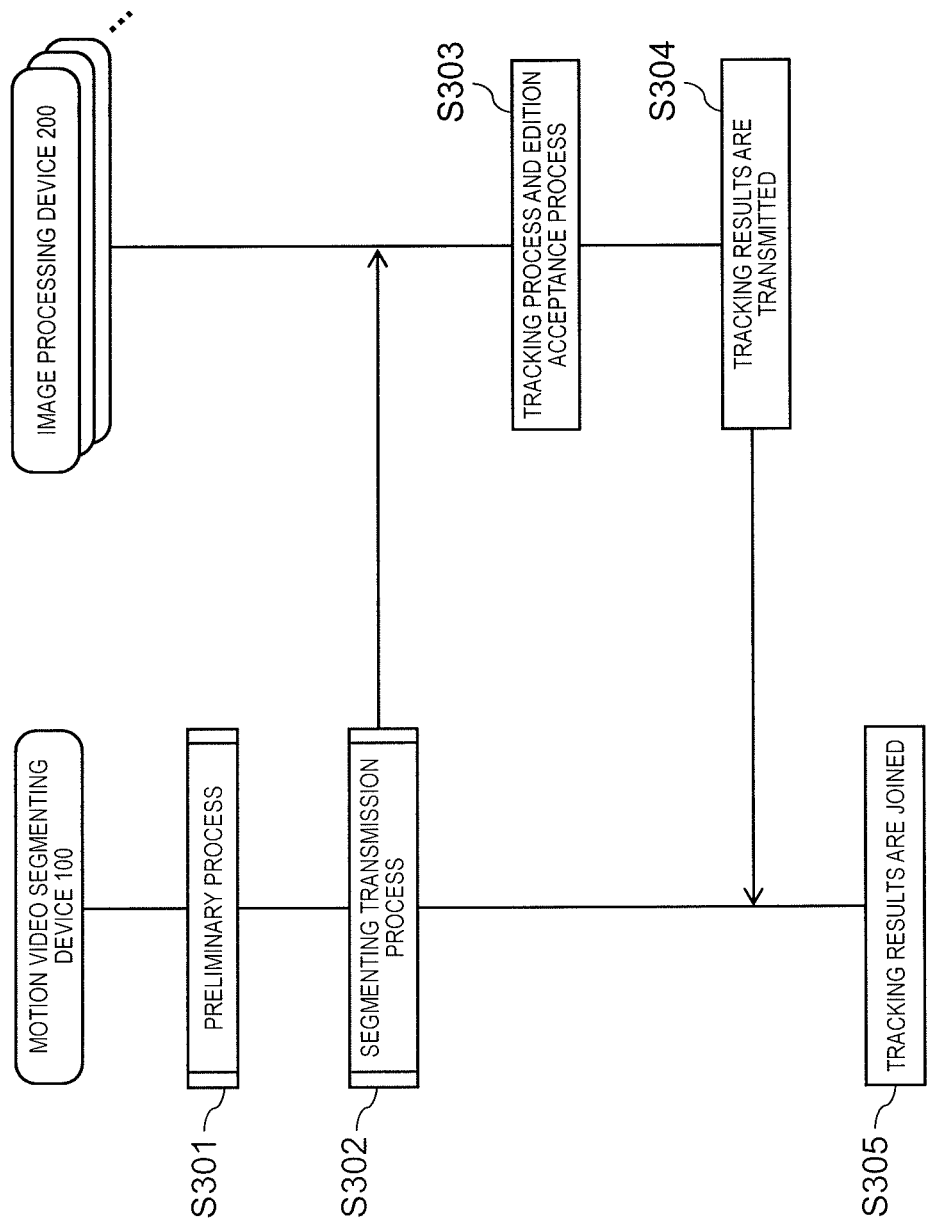
FIG. 3 is a sequence diagram for explaining a flow of an overall operation of the motion video processing system in Embodiment 1.

FIG. 3 is a sequence diagram for explaining a flow of an overall operation of motion video processing system 1 in Embodiment 1.

In step S301, motion video segmenting device 100 performs a preliminary process for segmenting the sports video. The preliminary process is processing for setting a region corresponding to the background in advance (for example, before the game starts) and acquiring background information in order to distinguish the player and the background (for example, a stadium or the like), for example, in the motion video. Details of the preliminary process will be described later.

In step S302, motion video segmenting device 100 segments the motion video into a plurality of pieces using information acquired in the preliminary process in step S301 and performs a segmenting transmission process which is transmitted to a plurality of image processing devices 200. Details of the segmenting transmission process will be described later.

In step S303, each of the plurality of image processing devices 200 performs a tracking process for tracking the position of the player, the ball, or the like reflected in the motion video on the segmented motion video received from motion video segmenting device 100, and an edition acceptance process for accepting an editing operation of an error in the tracking process performed by image processing device 200. The tracking process in image processing device 200 can use, for example, a moving body tracking technique of the related art.

The editing operation of an error in the tracking process is, for example, as follows. In a state where players are densely moving in the motion video, or the like, in the moving body tracking technique of the related art, for example, it is possible to be a situation in which two players who move adjacently are confused or the foot of the player is misidentified as a ball. When such a situation occurs, normal tracking of the player cannot be performed, so that it is necessary for the eyes of a person to check a result of the tracking process and perform correction. The edition acceptance process is a process of accepting the editing operation by a person (hereinafter, referred to as a corrector) who views a result of the tracking process. Specifically, for example, image processing device 200 displays the result of the tracking process on display unit 204 in almost real time and causes the corrector to determine whether or not the tracking process is incorrect. In a case where the tracking process is incorrect, the corrector accepts the correction via input unit 203. Image processing device 200 performs the edition acceptance process as described above.

In step S304, image processing device 200 transmits the result (one in which the editing operation is reflected) of the tracking process in step S303 to motion video segmenting device 100.

In step S305, motion video segmenting device 100 joins the tracking results. Motion video segmenting device 100 joins the tracking results by comparing the position (obtained by referring to the tracking result) of the player in an end frame and the position (obtained by referring to the tracking result or an initial posture assignment result) of the player in a start frame of each segmented motion video (pack) which is transmitted from image processing device 200 in step S304, and considering players who are present in close positions as the same player.

With such an operation, motion video processing system 1 can perform the tracking process of the player, the ball, or the like in the sports video with high accuracy in a short time.

[1.2.1 Preliminary Process]

Hereinafter, the preliminary process performed by motion video segmenting device 100 in step S301 of FIG. 3 will be described in detail. The preliminary process includes an extraction process of background information and a setting process of a difficulty degree determination region. Hereinafter, the extraction process of the background information and the setting process of the difficulty degree determination region will be described individually.

(1) Extraction Process of Background Information

A background region is a region in which one other than the player or the ball is reflected in still images configuring the motion video of the sports video. That is, the background region is, for example, a region in which a stadium in which the sports event is performed is reflected.

In the extraction process of the background information, first, motion video segmenting device 100 acquires an image in which the stadium of the sports which is a target of the sports video photographed therefrom is reflected from camera 300, and displays the image on display unit 104.

Figure 4:
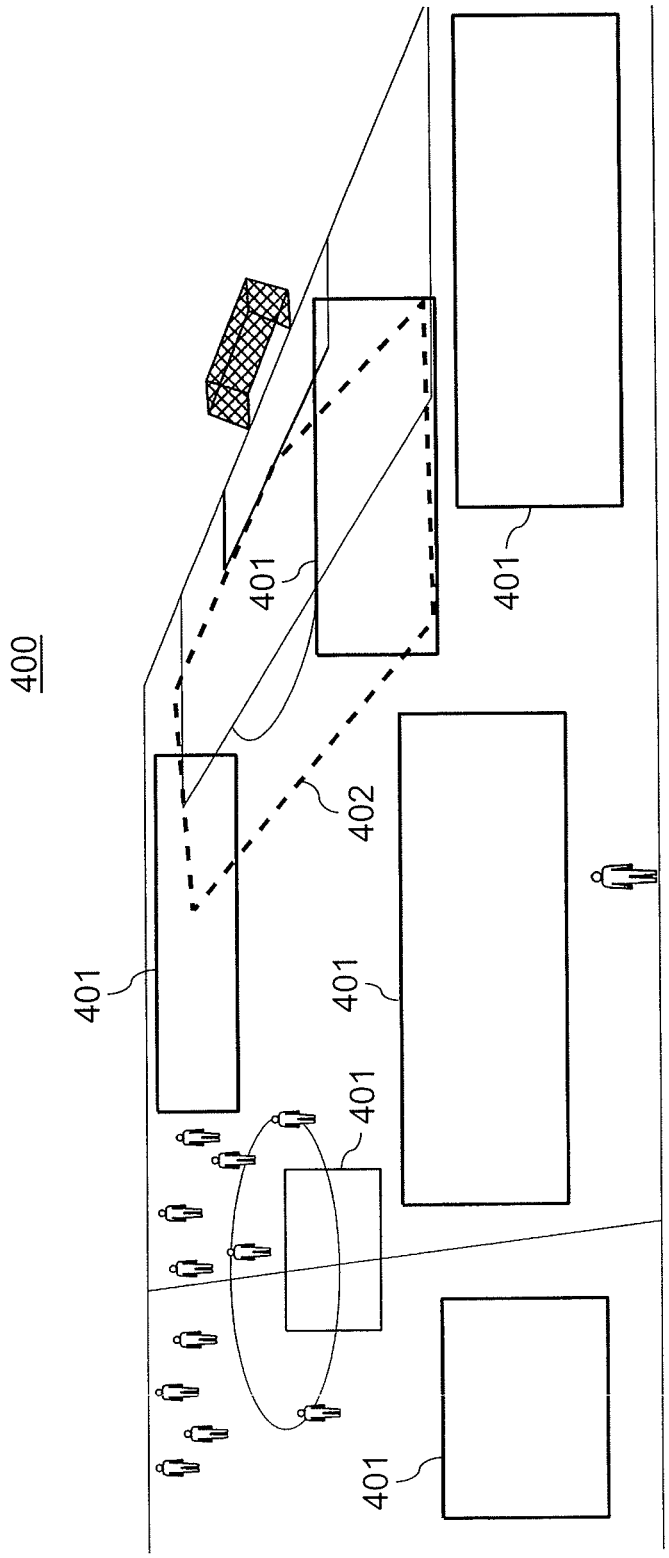
FIG. 4 is a view illustrating an example of a screen displayed on a display unit in a setting process of a background region.

FIG. 4 is a view illustrating an example of a screen displayed on display unit 104 in the extraction process of the background information. FIG. 4 is a screen displaying an image of field 400 photographed before game starts as an example of the sports event.

As illustrated in FIG. 4, in the preliminary process, it is desirable that the screen displayed on display unit 104 is an image where there are a few players or the players are not scattered throughout the stadium in order to set the background region in which the player or the like is not reflected. Therefore, the preliminary process is performed, for example, immediately before the game starts.

At the start of the preliminary process, motion video segmenting device 100 displays the image of the stadium on display unit 104 and then displays an instruction message of an effect that an operator selects the background region. When the operator who views the instruction message performs a selection operation to select the background region via input unit 103 for the image of the stadium displayed on display unit 104, motion video segmenting device 100 accepts a selection operation. Therefore, motion video segmenting device 100 sets the background region. For example, the operator is a person who performs an operation in the preliminary process while viewing display unit 104.

In FIG. 4, regions 401 surrounded by solid lines illustrate the background regions selected by the operator. The operator designates region 401 illustrated in FIG. 4 using, for example, an operation device such as a mouse, a trackball, or a touch panel configuring input unit 103. When the instruction message of the effect that the background region is selected is displayed to the operator, motion video segmenting device 100 instructs the operation to set a region, which does not include an object that may move during the game such as the player or the ball, as the background region. Motion video segmenting device 100 can set region 401 in which the player, the ball, or the like is not included as the background region by following the instruction by the operator. In FIG. 4, since a person or the like is present in the image of the stadium, region 401 is designated by the operator so as to avoid the person. In a case where the person or the like is not present in the image of the stadium, the whole field may be designated as region 401.

Motion video segmenting device 100 extracts information included in each pixel of a region for each region 401 set by the operator and stores the information in storage unit 102 as the background information. One which is extracted by motion video segmenting device 100 as the background information is, for example, a range of a hue value obtained by region 401. Motion video segmenting device 100 may extract not only the hue but also a value of saturation and/or a value as the background information.

(2) Setting process of Difficulty Degree Determination Region

Motion video segmenting device 100 performs the setting process of the difficulty degree determination region in addition to the extraction process of the background information described above. The difficulty degree determination region is a region which is set to determine whether or not the difficulty degree of the editing operation is high in the edition acceptance process for accepting the editing operation performed by the corrector on the result of the tracking process performed by image processing device 200. The difficulty degree determination region of the embodiment corresponds to a specific region of the disclosure.

In the preliminary process, the order in which the extraction process of the background information and the setting process of the difficulty degree determination region which are described above are performed is not limited by the disclosure. That is, the extraction process of the background information may be performed first, the setting process of the difficulty degree determination region may be performed first, or the extraction process of the background information and the setting process of the difficulty degree determination region may be performed at the same time.

Whether or not the difficulty degree of the editing operation is high may be determined, for example, based on a feature amount extracted from the image (still image) of each frame configuring the motion video. The feature amount is an element indicating a feature of the player in the image. As a specific example of the feature amount, for example, a color, a luminance, a position of a vertex and a shape, or the like of the image corresponding to the player is provided. In addition, another known feature amount may be used as long as it indicates the feature of the player in the image. Hereinafter, for example, a case where a rate occupied by a region corresponding to the player to the whole image is adopted as the feature amount extracted from the image will be described.

In the setting process of the difficulty degree determination region, motion video segmenting device 100 displays an instruction message to the operator on display unit 104. The instruction message indicates that the difficulty degree determination region is to be set to the operator. When the operator who views the instruction message performs the selection operation for selecting the difficulty degree determination region via input unit 103 for the image of the stadium displayed on display unit 104, motion video segmenting device 100 accepts the selection operation thereof. Therefore, motion video segmenting device 100 sets the difficulty degree determination region.

Specifically, the operator designates region 402, for example, illustrated in FIG. 4 using the operation device such as a mouse, a trackball, or a touch panel configuring input unit 103. When the instruction message, indicating that the difficulty degree determination region is to be set, is displayed to the operator, for example, motion video segmenting device 100 instructs the operator to set a region, in which many players may be present during the game, as the difficulty degree determination region. Motion video segmenting device 100 can set region 402 in which many players may be present during the game as the difficulty degree determination region by following the instruction by the operator.

In FIG. 4, region 402 surrounded by a dotted line illustrates the difficulty degree determination region which is selected by the operator. In FIG. 4, as an example, a case where a vicinity of a penalty area in a soccer field is selected as the difficulty degree determination region is illustrated. The vicinity of the penalty area is a region where it is easy to play involved in scoring and for the players to be more likely to be densely populated in a case where the ball is in the penalty area, so that it is desirable that the region is set as the difficulty degree determination region. In the disclosure, the difficulty degree determination region is not limited to the vicinity of the penalty area. For example, another region of the field may be selected and set as the difficulty degree determination region and in a case of another sports event, a region, where the players are more likely to be densely populated and which is specific to the game, may be selected and set as the difficulty degree determination region.

Region 402 which is selected by the operator as the difficulty degree determination region may be not only one but also plural.

Motion video segmenting device 100 stores a position of the region in storage unit 102 as position information of the difficulty degree determination region for each region 402 set by the operator. The position information of the difficulty degree determination region may be, for example, information in which any coordinate system is set in the still image and which includes a coordinate indicating the position of the difficulty degree determination region in the coordinate system, or the like.

[1.2.2 Segmenting Transmission Process]

Figure 5:
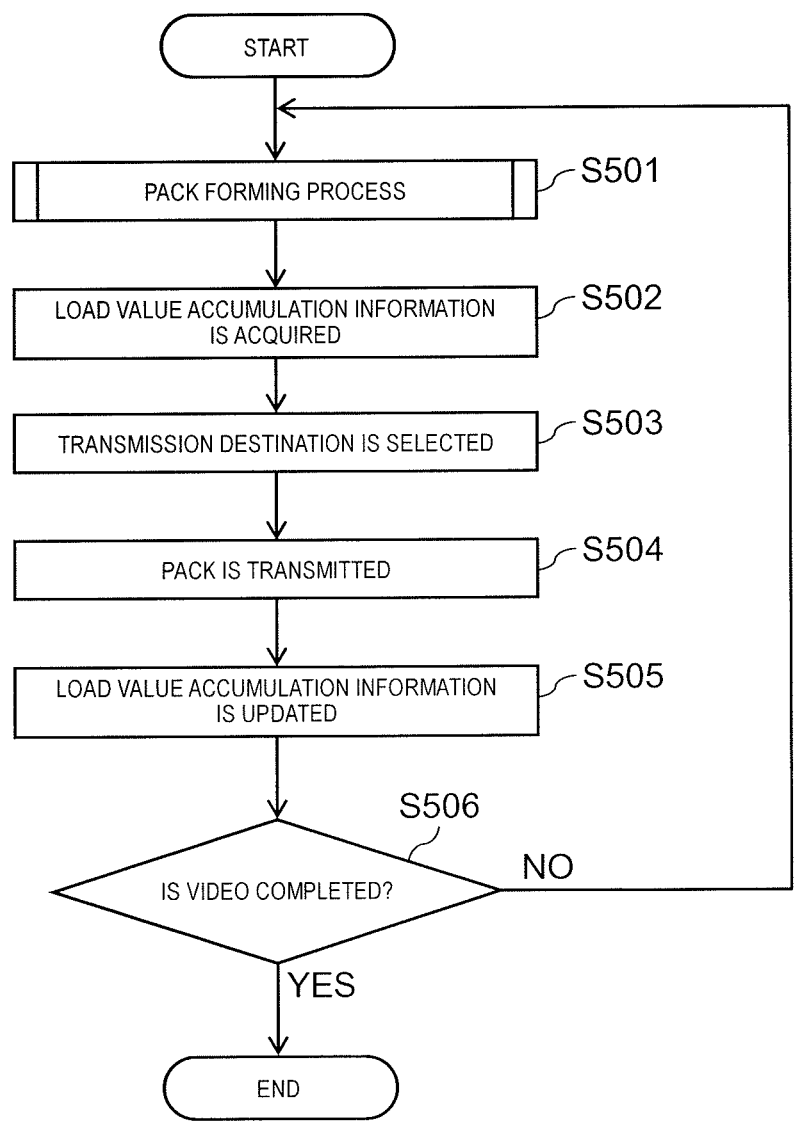
FIG. 5 is a flowchart for explaining an operation of the motion video segmenting device in a segmenting transmission process of Embodiment 1.

Next, the segmenting transmission process in step S302 of FIG. 3 will be described in detail. FIG. 5 is a flowchart for explaining an operation of motion video segmenting device 100 in the segmenting transmission process of Embodiment 1.

In step S501, motion video segmenting device 100 performs a pack forming process on the motion video photographed by camera 300. The pack forming process is a process of segmenting the motion video and forming a plurality of groups (hereinafter, referred to as packs).

[1.2.2.1 Pack Forming Process]

Figure 6:
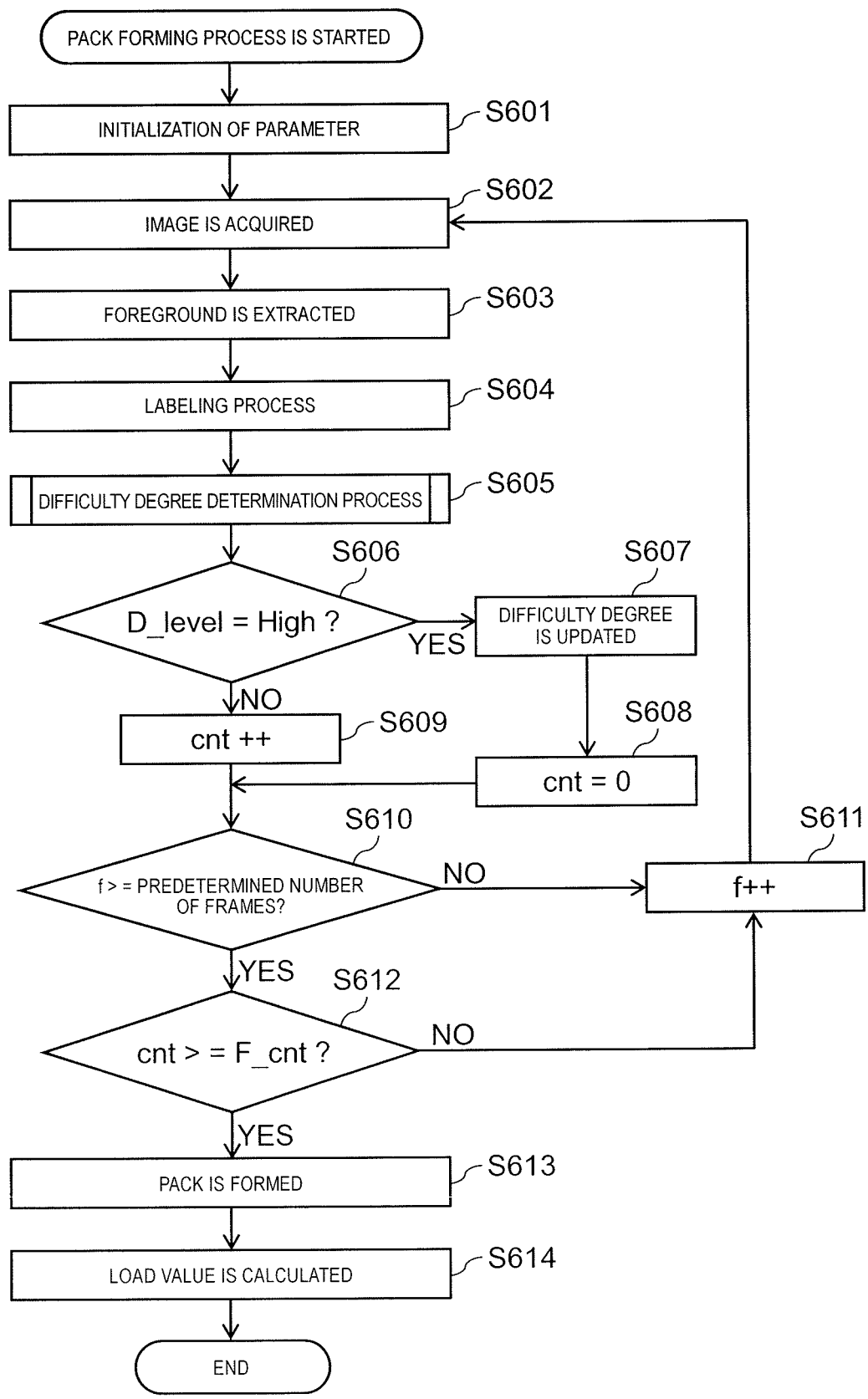
FIG. 6 is a flowchart for explaining an operation of the motion video segmenting device in a pack forming process.

Hereinafter, details of the pack forming process will be described. FIG. 6 is a flowchart for explaining an operation of motion video segmenting device 100 in a pack forming process. A processing target of the pack forming process illustrated in FIG. 6 is each still image configuring the motion video input from camera 300.

In step S601, motion video segmenting device 100 performs initialization of parameters used in the pack forming process. The parameters used in the pack forming process are the number of frames f, count value cnt, and difficulty degree D_level of the still image corresponding to the number of frames f. The number of the frames is set to f=0, count value cnt=0, and the difficulty degree is set to D_level=Low by initialization of step S601.

In step S602, motion video segmenting device 100 acquires the still image of $f^{th}$ frame of the motion video input from camera 300. The still image of the $f^{th}$ frame is a still image of the processing target in each step described below. In step S603, motion video segmenting device 100 extracts a foreground region from the still image acquired in step S602.

The foreground region is a region other than the background region in the still image. That is, in step S603, motion video segmenting device 100 extracts a foreground image based on the background information extracted in the preliminary process which is described above. Specifically, information of the hue or the like extracted as the background information is compared to information of the hue of each pixel in the still image, so that motion video segmenting device 100 extracts an image configured of pixels having large divergence as a result of the comparison as the foreground image. Motion video segmenting device 100 generates a binarized image in which a pixel value of the pixels configuring the background region is set to 0 (black) and a pixel value of the pixels configuring the foreground region is set to 255 (white) respectively in the still image of the $f^{th}$ frame. Hereinafter, the binarized image generated by motion video segmenting device 100 in step S603 is referred to as the foreground image.

In step S604, motion video segmenting device 100 performs a labeling process using the foreground image generated in step S603. The labeling process is a process in which the same number is allocated to continuous pixels of which a pixel value is 255 (white). That is, different numbers are assigned to respective independent foreground regions by the labeling process. In the following description, the foreground region in which the labeling process is performed is referred to as a labeling region and the number of the labeling regions in the foreground image is referred to as a labeling number. In step S604, motion video segmenting device 100 generates position information of the labeling region relating to the position of the labeling region and stores the position information in storage unit 102.

In step S605, motion video segmenting device 100 performs the difficulty degree determination process. The difficulty degree determination process is a process of determining whether or not the difficulty degree of the editing operation is high in the edition acceptance process of accepting the editing operation performed by the corrector with respect to the result of the tracking process performed by image processing device 200.

[1.2.2.1.1 Difficulty Degree Determination Process]

Figure 7:
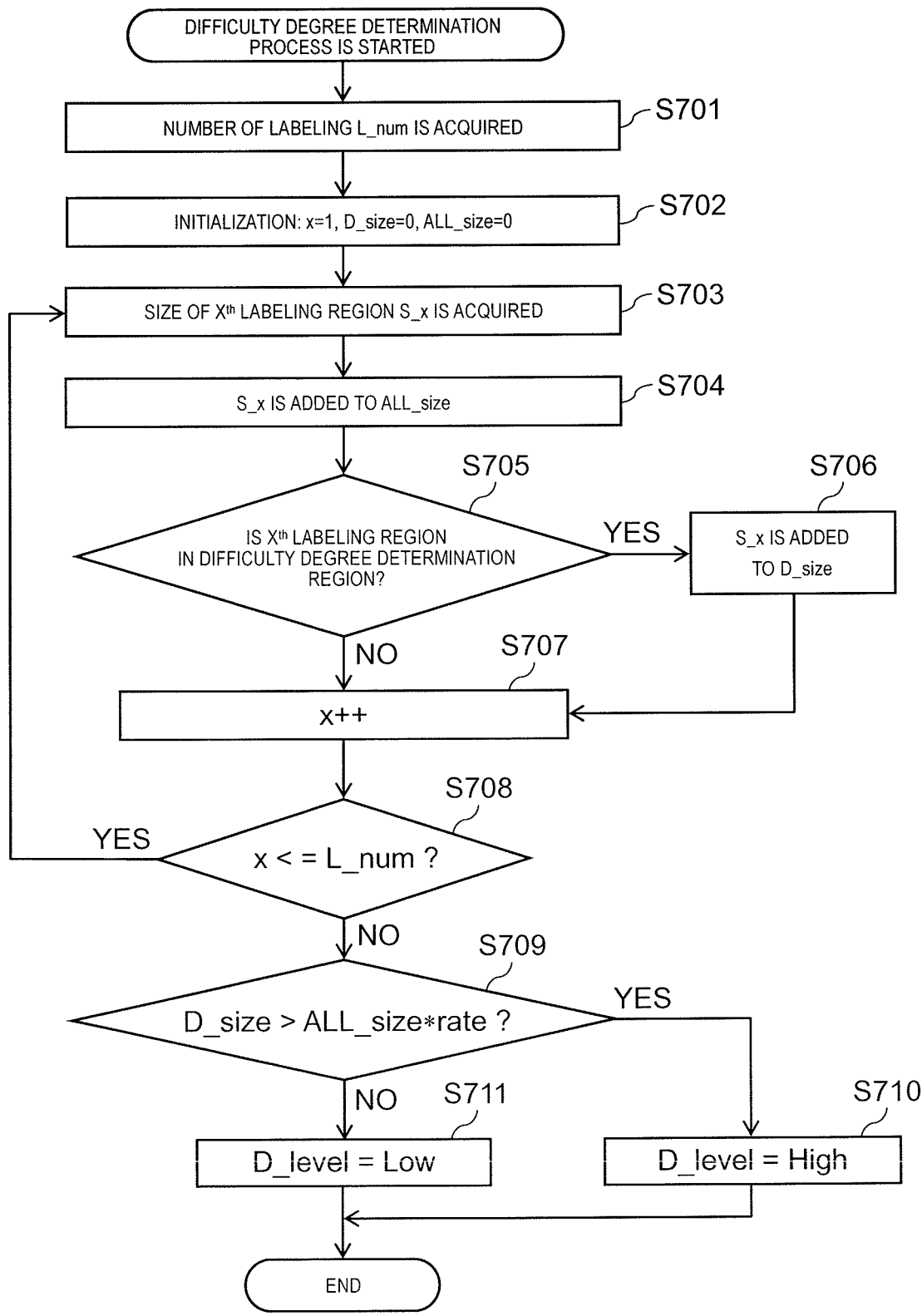
FIG. 7 is a flowchart for explaining an operation of the motion video segmenting device in a difficulty degree determination process.

Hereinafter, details of the difficulty degree determination process will be described. FIG. 7 is a flowchart for explaining an operation of motion video segmenting device 100 in the difficulty degree determination process.

In step S701, motion video segmenting device 100 acquires the number of labeling L_num determined by the labeling process of step S604 in the still image of the $f^{th}$ frame that is the processing target.

In step S702, motion video segmenting device 100 performs initialization of the parameters using in the difficulty degree determination process. The parameters using in the difficulty degree determination process are counter value x indicating what number of the labeling region in the still image, foreground amount D_size in the difficulty degree determination region, and foreground amount ALL_size of the whole still image. Moreover, the foreground amount is an amount indicating a size of the foreground region, specifically, for example, the number of pixels.

In step S703, motion video segmenting device 100 acquires size S_x of an $x^{th}$ labeling region. In step S704, motion video segmenting device 100 adds size S_x of the $x^{th}$ labeling region to foreground amount ALL_size of the whole still image.

In step S705, motion video segmenting device 100 determines whether or not the $x^{th}$ labeling region is within the difficulty degree determination region. The determination in step S705 may be performed based on the position information of the difficulty degree determination region and the position information of the labeling region. In a case where it is determined that the $x^{th}$ labeling region is within the difficulty degree determination region in step S705 (step S705: Yes), the procedure proceeds to step S706 and otherwise (step S705: No), the procedure proceeds to step S707.

In step S706, motion video segmenting device 100 adds size S_x of the $x^{th}$ labeling region to foreground amount D_size within the difficulty degree determination region. The procedure proceeds to step S707.

In step S707, motion video segmenting device 100 increments counter value x by 1 and the procedure proceeds to step S708.

In step S708, motion video segmenting device 100 determines whether or not counter value x reaches the number of labeling L_num. In a case where it is determined that counter value x does not reach the number of labeling L_num in step S708 (step S708: Yes), the process returns to step S703 and otherwise (step S708: No), the procedure proceeds to step S709.

In step S709, motion video segmenting device 100 determines whether or not foreground amount D_size within the difficulty degree determination region is larger than a value obtained by multiplying foreground amount ALL_size of the whole still image by predetermined rate "rate". Predetermined rate "rate" is a preset rate for determining whether or not the difficulty degree of the editing operation is high and is, for example, 60%. In a case where it is determined that foreground amount D_size within the difficulty degree determination region is larger than the value obtained by multiplying foreground amount ALL_size of the whole still image by predetermined rate "rate" in step S709 (step S709: Yes), the procedure proceeds to step S710 and otherwise (step S709: No), the procedure proceeds to step S711.

In step S710, motion video segmenting device 100 determines that difficulty degree D_level of the still image of the $f^{th}$ frame which is the processing target is High.

On the other hand, in step S711, motion video segmenting device 100 determines that difficulty degree D_level of the still image of the $f^{th}$ frame is Low.

That is, in the difficulty degree determination process illustrated in FIG. 7, in the still image of the $f^{th}$ frame, in a case where foreground amount D_size within the difficulty degree determination region is larger than the value obtained by multiplying foreground amount ALL_size of the whole still image by predetermined rate "rate", since it is assumed that there are many players in the image, it is determined that the difficulty degree is high.

Returning to the explanation of FIG. 6. In step S606, motion video segmenting device 100 determines whether or not difficulty degree D_level is High in the difficulty degree determination process of step S605. In step S606, in a case where it is determined that difficulty degree D_level is High (step S606: Yes), the procedure proceeds to step S607 and otherwise (step S606: No), the procedure proceeds to step S609.

In step S607, motion video segmenting device 100 updates difficulty degree D_level of the still image of the $f^{th}$ frame to High. In step S608, motion video segmenting device 100 resets count value cnt to 0 and the process proceeds to step S610.

In step S609, motion video segmenting device 100 increments count value cnt by 1 and the procedure proceeds to step S610.

In step S610, motion video segmenting device 100 determines whether or not the number of the frames f of the still image of the processing target is predetermined number F (for example, F=750 frames) or more. In step S610, in a case where it is determined that the number of the frames f is predetermined number F or more (step S610: Yes), the procedure proceeds to step S612 and otherwise (step S610: No), the procedure proceeds to step S611.

In step S611, motion video segmenting device 100 increments the number of frames f by 1 and the process returns to step S602.

In step S612, motion video segmenting device 100 determines whether or not count value cnt is predetermined value F_cnt or more. In step S612, in a case where it is determined that count value cnt is predetermined value F_cnt (for example, 10) or more (step S612: Yes), the procedure proceeds to step S613 and otherwise (step S612: No), the process returns to step S611.

In steps S608 and S609, count value cnt is reset to 0 in a case where difficulty degree D_level of the still image of the processing target is updated to High, and is incremented by 1 in a case where difficulty degree D_level is Low. That is, only in a case where the still image of which difficulty degree D_level is Low continues for F_cnt frame or more, in step S612, count value cnt is predetermined value F_cnt or more. Therefore, a process of step S613 is performed in a case where the number of frames f of the still image of the processing target is predetermined number F or more from the start of the pack forming process and the still image of which difficulty degree D_level is Low continues F_cnt frame or more.

In the embodiment, as described above, it is determined whether or not the number of continuous still images of which the difficulty degree is Low is a predetermined value or more by using the count control, and then the motion video is segmented, but the configuration is not indispensable. For example, in a case where it is determined that the difficulty degree of the frame of the processing target is Low, the motion video may be segmented by the frame. Even in this case, since any of the still images before and after the segmentation of the motion video has the difficulty degree in Low, the accuracy of the image analysis improves before or after of the segmentation of the motion video, and the accuracy of the motion video analysis which is performed by segmenting the motion video can be increased.

However, if it is determined whether or not the number of continuous still images of which the difficulty degree is Low is a predetermined value or more by using the count control, and then the motion video is segmented as described in the embodiment, the difficulty degree of the still images before and after the segmentation of the motion video tends to be continuously Low for a predetermined number or more, because it is empirically known that the still images of which the difficulty degree is Low continue for a while after the segmentation. When the still images of which the difficulty degree is Low continue, since the accuracy of the image analysis before and after the segmentation of the motion video further improves, the accuracy of the motion video analysis performed by segmenting the motion video can be further increased.

In step S613, motion video segmenting device 100 performs pack formation as one group (pack) from the still image of a $0^{th}$ frame which is the start frame of the pack forming process to the still image of the $f^{th}$ frame. A length of the pack formed in step S613 is predetermined number of frames F or more. In addition, the difficulty degree of the still image of an end frame of the pack is Low.

In the embodiment, as described above, the pack formation is performed so that the difficulty degree of the still image of the end frame of the pack is Low. In this way, the accuracy of the image analysis on the still image of the end frame improves, so that the accuracy of the motion video analysis performed by segmenting the motion video can be further increased.

In addition, as another embodiment, pack formation is performed as one group (pack) from the still image of a $0^{th}$ frame to the still image of (f-a predetermined number-th frame), so that the difficulty degree of the still image of the start frame of the pack may be Low. In this way, the accuracy of the image analysis on the still image of the start frame improves, so that the accuracy of the motion video analysis performed by segmenting the motion video can be further increased.

In addition, as another embodiment, pack formation is performed as one group (pack) from the still image of the $0^{th}$ frame to the still image of f-$1^{st}$ frame, so that the difficulty degree of the still images of both the start frame and the end frame of the pack may be Low.

In step S614, motion video segmenting device 100 calculates a load value of the pack formed in step S613. The load value is a degree indicating a load when the corrector performs the editing operation of the pack in image processing device 200.

A setting method of the load value is specifically described. As one setting method, for example, there is a method of setting the load value based on a rate occupied by the still image in which difficulty degree D_level is High in the still images included in the pack.

FIG. 8 is a diagram illustrating a first example of a setting method of the load value. In FIG. 8, columns on a left indicate rates of the still image in which the difficulty degree D_level is High to the whole pack and columns on a right indicate examples of the load value according to the rates. In the example illustrated in FIG. 8, in a case where the rate of the number of the frames of the difficulty degree of High to the whole pack is 0, the load value is set to 1. In addition, in a case where the rate of the number of the frames of the difficulty degree of High to the whole pack is larger than 0 and less than 0.25, the load value is set to 2. In addition, in a case where the rate of the number of the frames of the difficulty degree of High to the whole pack is 0.25 or larger and less than 0.5, the load value is set to 3. In addition, in a case where the rate of the number of the frames of the difficulty degree of High to the whole pack is 0.5 or larger and less than 0.75, the load value is set to 4. In addition, in a case where the rate of the number of the frames of the difficulty degree of High to the whole pack is 0.75 or larger and 1.0 or less, the load value is set to 5.

That is, in the first example of the setting method of the load value, the lower the rate of the number of the frames of the difficulty degree of High to the whole pack is, the lower the load value is set, and higher the rate is, higher the load value is set. Moreover, in the example illustrated in FIG. 8, the load value is set to five stages, but the disclosure is not limited thereto. For example, the load value may have stages less than 5 stages, such as two stages, or may have stages larger than 5 stages illustrated in FIG. 8. In a case where the load value has 2 stages, for example, in a case where the frame of the difficulty degree of High is one, the load value may be 1, and in a case where the number of the frames of the difficulty degree of High is 0, the load value may be 0.

FIG. 9 is a diagram illustrating a second example of a setting method of a load value. In FIG. 9, columns on a left indicate rates of the number of the frames of the whole pack to a predetermined number of frames and columns on a right indicate examples of the load value according to the rates. Moreover, the predetermined number of frames may be the same as the predetermined number of frames F described in step S610 of FIG. 6, or may be different therefrom. In the example illustrated in FIG. 9, in a case where the number of the frames of the whole pack is 1 time or less of the predetermined number of the frames, the load value is set to 1. In addition, in a case where the number of the frames of the whole pack is 1 time or more and 1.5 time or less of the predetermined number of the frames, the load value is set to 2. In addition, in a case where the number of the frames of the whole pack is 1.5 time or more and 2 time or less of the predetermined number of the frames, the load value is set to 3. In addition, in a case where the number of the frames of the whole pack is 2 time or more of the predetermined number of the frames, the load value is set to 4.

In the second example of the setting method of the load value, the lower the rate of the number of the frames of the whole pack to the predetermined number of the frames is, that is, the lower the length of the pack is, lower the load value is set and higher the rate is set, that is, the longer the length of the pack is, the higher the load value is set. Moreover, in the example illustrated in FIG. 9, the load value is set to 4 stages, but the disclosure is not limited thereto. For example, the load value may have stages less than 4 stages, such as 2 stages, or may have stages larger than 4 stages illustrated in FIG. 9.

As described above, motion video segmenting device 100 segments the motion video into the plurality of the packs including the still images of the predetermined number of the frames or more. More specifically, motion video segmenting device 100 determines the difficulty degree of each image configuring the pack, and in a case where the image of the difficulty degree of Low continues predetermined value F_cnt or more, the motion video is segmented and the pack is formed in a vicinity of a last image of the continuous images.

Returning to the explanation of FIG. 5. In step S502, motion video segmenting device 100 acquires the load value accumulation information for each of the plurality of image processing devices 200, which are candidates of the transmission destination of the plurality of the packs formed in step S501.

Figure 10:
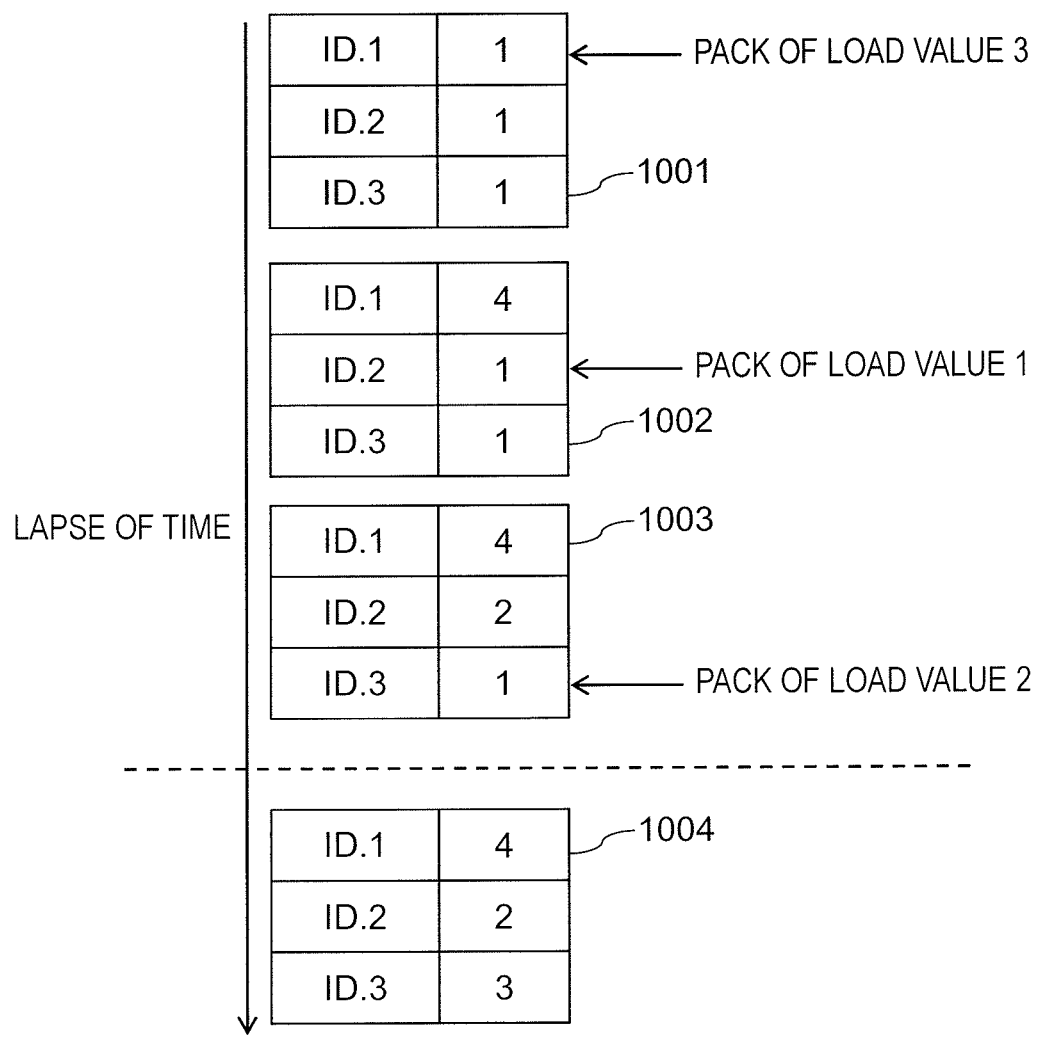
FIG. 10 is a diagram for explaining load value accumulation information.

FIG. 10 is a diagram for explaining the load value accumulation information. In FIG. 10, identification information (ID) of image processing device 200 that is the candidate of the transmission destination of the pack and tables 1001 to 1004 indicating the load value accumulation information are illustrated. The load value accumulation information in the tables 1001 to 1004 is updated with a lapse of time.

The table 1001 indicates a load value in an initial state in which no pack is transmitted to any one of image processing devices 200 of ID. 1 to ID. 3. An initial value of the load value is 1 and the load value accumulation information of each of three image processing devices 200 of ID. 1 to ID. 3 is 1. Hereinafter, for simplicity, for example, the load value accumulation information of image processing device 200 of ID. 1 is described like the load value of ID. 1.

The table 1002 indicates a load value in a state where time elapses from the table 1001 and a first pack having the load value of 3 is transmitted. Since the pack of the load value of 3 is transmitted to ID. 1, in the table 1002, the load value of ID. 1 is updated to 4.

Furthermore, the table 1003 indicates a load value in a state where time elapses from the table 1002 and a second pack having the load value of 1 is transmitted. Since the pack of the load value of 1 is transmitted to ID. 2, in the table 1003, the load value of ID. 2 is updated to 2.

The table 1004 indicates a load value in a state where time elapses from the table 1003 and a third pack having the load value of 2 is transmitted. Since the pack of the load value of 2 is transmitted to ID. 3, in the table 1004, the load value of ID. 3 is updated to 3.

As described above, the load value accumulation information is a value obtained by accumulating the load value of the pack transmitted to any one of the plurality of image processing devices 200 before the current time for each image processing device 200.

Returning to the explanation of FIG. 5. In step S503, motion video segmenting device 100 determines image processing device 200 which is the transmission destination to which the pack generated in step S501 is transmitted based on the load value accumulation information acquired in step S502.

As a method of determining the transmission destination, for example, there is a method of referring the load value accumulation information acquired in step S502 and setting image processing device 200 having a smallest accumulation value of the load value to the transmission destination. In addition, in a case where the plurality of image processing devices 200 having the same load value accumulation information are present such as a state where the pack is not transmitted, for example, image processing device 200 having the smallest ID may be determined as the transmission destination.

In step S504, motion video segmenting device 100 transmits the pack generated in step S501 to the transmission destination determined in step S503.

In step S505, motion video segmenting device 100 updates the load value accumulation information corresponding to image processing device 200 of the transmission destination. Specifically, the load value calculated in step S614 is added to the load value accumulation information of image processing device 200 of the transmission destination and is updated.

In step S506, motion video segmenting device 100 determines whether or not the motion video is completed with the pack generated in step S501. Moreover, the completion of the motion video means that camera 300 stops photographing of the motion video, for example, due to the completion of the game of the sports event photographed by camera 300. In step S506, in a case where it is determined that the motion video is completed (step S506: Yes), the procedure is completed and otherwise (step S506: No), the process returns to step S501, and a process of forming a next pack is performed.

Moreover, the start frame (image obtained in the second and subsequent steps S602) of the next pack forming process may be the $f^{th}$ frame that is a final value in the previous pack forming process.

In this way, the start frame of the next pack forming process and the end frame of the previous pack forming process overlap. When the start frame of the next pack forming process and the end frame of the previous pack forming process overlap, the position (obtained by referring to the tracking result) of the player and the position of the player in the start frame in the end frame of each segmented motion video (pack) overlap, so that the accuracy of the process of step S305 improves and, as a result, the accuracy of joining of the tracking results is improved. Moreover, even in a case where the start frame of the next pack forming process and the end frame of the previous pack forming process do not overlap, since the difficulty degree of the end frame of the previous pack forming process is Low, the accuracy of the position of the player in the end frame is improved, and thereby the accuracy of the joining of the tracking results is improved.

In addition, if the start frame (image obtained in the second and subsequent step S602) of the next pack forming process is the $f^{th}$ frame that is a final value in the previous pack forming process, it is also guaranteed that the difficulty degree of the start frame of the next pack forming process is Low. If the difficulty degree of the start frame is Low, as described later, there is also an advantage that the accuracy of processing of imparting the initial posture of the player to the still image. Moreover, even if the end frame of the previous pack forming process is the $(f-1^{st})$ frame and the start frame of the next pack forming process is the $f^{th}$ frame, it is guaranteed that the difficulty degree of the start frame of the next pack forming process is Low.

[1.2.3 Subsequent Processes]

When the pack is transmitted from motion video segmenting device 100 to image processing device 200 in step S504 illustrated in FIG. 5, as illustrated in FIG. 3, image processing device 200 receives the pack and performs the tracking process on the received pack. Image processing device 200 displays the result of the tracking process on display unit 204 in almost real time and causes the corrector to determine whether or not the tracking process is incorrect. In a case where the tracking process is incorrect, the edition acceptance process of accepting the correction by the corrector via input unit 203 is performed (step S303). The tracking process and the edition acceptance process are mainly performed by processor 201 in cooperation with the respective other configuration elements of image processing device 200.

Specifically, the tracking process includes a player detection process of extracting a region corresponding to the player in the image, a posture imparting process of imparting an initial posture of the player in a leading image (start frame) of the pack, a team identification process of identifying a team to which the player belongs based on a color of the player or the like which is extracted, a position tracking process of tracking a position of the player, sports equipment such as a ball, and the like. Detailed description of the player detection process, the posture imparting process, the team identification process, the position tracking process, and the edition acceptance process is disclosed, for example, in PTL 1.

When the tracking process and the edition acceptance process are completed, image processing device 200 generates a tracking result listing the position of the player in each still image included in the pack. The tracking result generated by image processing device 200 is transmitted to motion video segmenting device 100 (step S304 of FIG. 3). Motion video segmenting device 100 joins the tracking results received from image processing device 200 in order to generate movement information for one game of each player (step S305 of FIG. 3). The movement information for one game generated as described above is useful for being superimposed on the motion video and displayed, objectively evaluating, for example, the momentum and mobility of the player, or constructing a strategy through the game.

[1.3 Effects Etc.]

As described above, in the embodiment 1, motion video processing system 1 includes motion video segmenting device 100, image processing device 200, and camera 300. Motion video segmenting device 100 extracts the feature amount from the image (still image) configuring the motion video photographed by camera 300, and determines the difficulty degree when the editing operation is performed on the image based on the feature amount. In the embodiment, the rate occupied by the region corresponding to the player to the whole image is adopted as the feature amount. In addition, the editing operation is an operation performed by the corrector to correct and edit the error in the tracking process of tracking the position of the player, the ball, or the like in the image, which is automatically performed by image processing device 200.

Motion video segmenting device 100 segments the motion video photographed by camera 300 into the plurality of groups (packs), and determines image processing device 200 transmitting the pack based on the difficulty degree of the image included in the pack. More specifically, motion video segmenting device 100 determines the difficulty degree of each motion video configuring the pack, and in a case where the image of the difficulty degree of Low continues predetermined value F_cnt or more, the motion video is segmented and the pack is formed on one image before the last image of the continuous images. Therefore, the difficulty degree of the still image of the start frame or the end frame of each pack formed by motion video segmenting device 100 can be Low. As a result, the accuracy of connecting the tracking results can be improved.

Therefore, according to motion video processing system 1, it is possible to avoid segmenting the motion video before or after the still image where the difficulty degree of the editing operation in image processing device 200 is high.

In addition, motion video segmenting device 100 calculates the load value for each pack and determines image processing device 200, as the transmission destination, having the smallest accumulation value of the load value of the pack which is transmitted previously when image processing device 200 which is the transmission destination of the pack is determined.

With such a configuration, motion video segmenting device 100 can determine image processing device 200 having a small load as a transmission destination of a formed pack when the pack is formed from the image photographed by camera 300. Therefore, the pack can be preferentially transmitted to image processing device 200 having a small load, so that the load of the editing operation can be dispersed for each image processing device 200 and the tracking process of the position of the player, the ball, or the like in the motion video can be efficiently performed.

Embodiment 2

[2.1 Configuration]

Hereinafter, motion video processing system 1 of Embodiment 2 will be described. As illustrated in FIG. 1, in Embodiment 2, motion video processing system 1 includes motion video segmenting device 100, a plurality of image processing devices 200A, 200B, 200C, . . . , and camera 300. Motion video segmenting device 100 and camera 300, and motion video segmenting device 100 and the plurality of image processing devices 200A, 200B, 200C, . . . are connected so as to be capable of communicating to each other.

Motion video segmenting device 100 and image processing device 200 are configured by, for example, computers such as PCs and workstations. As illustrated in FIG. 2, motion video segmenting device 100 (or image processing device 200) includes processor 101 (201), storage unit 102 (202), input unit 103 (203), display unit 104 (204), communication unit 105 (205), and bus 106 (206).

[2.2 Operation]

Next, an operation of motion video processing system 1 in Embodiment 2 will be described. In the following description, the operation of motion video segmenting device 100 is mainly performed by processor 101 in cooperation with respective other configuration elements of motion video segmenting device 100.

Motion video processing system 1 tracks a position of a player, a sports equipment (ball or the like), or the like reflected in the motion video based on a sports video configured by the motion video of the sports event photographed by camera 300.

Figure 11:
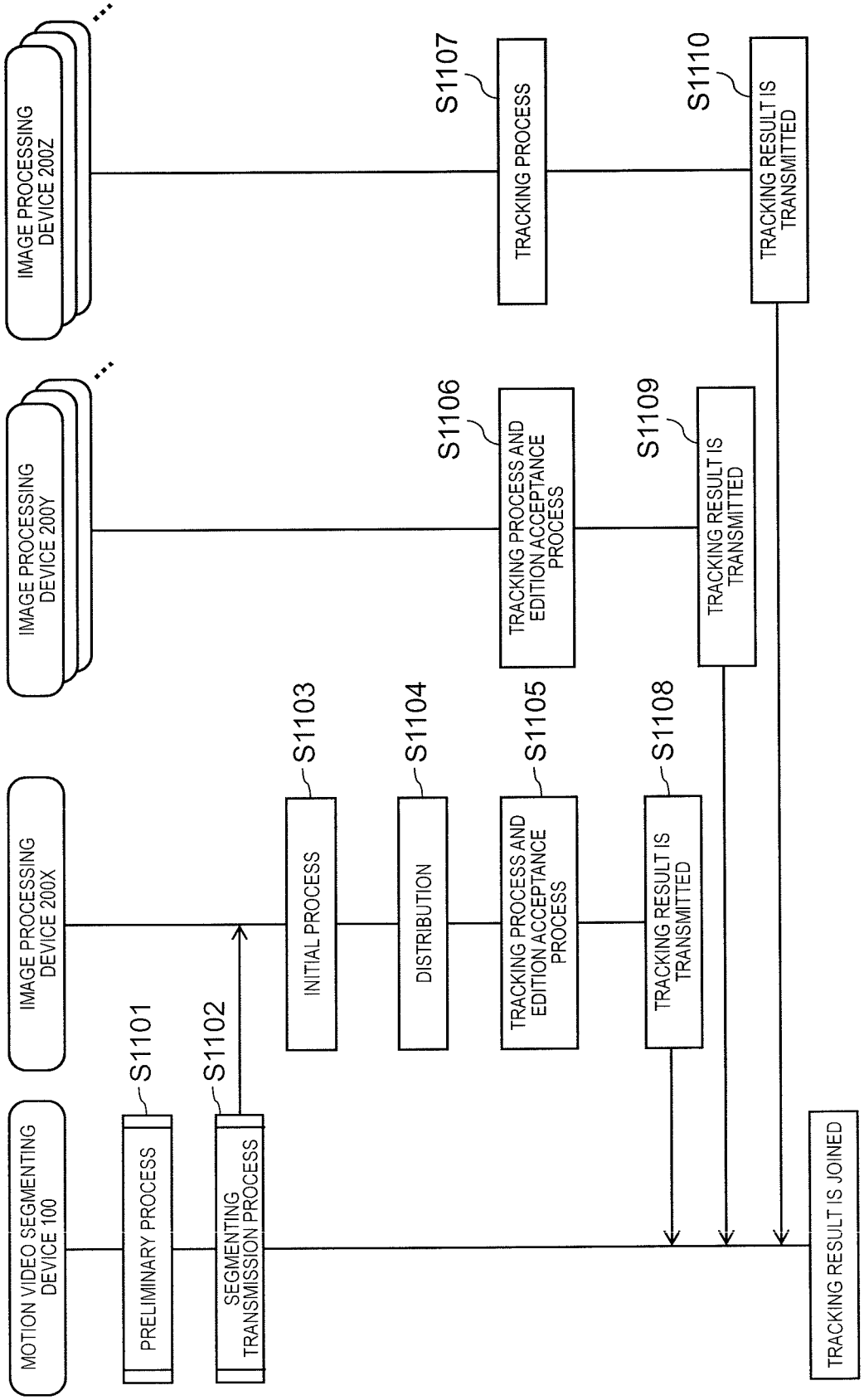
FIG. 11 is a sequence diagram for explaining a whole operation of a motion video processing system in Embodiment 2.

FIG. 11 is a sequence diagram for explaining a whole operation of motion video processing system 1 in Embodiment 2. In FIG. 11, in the plurality of image processing devices 200, image processing device 200X, a plurality of image processing devices 200Y, and a plurality of image processing devices 200Z, . . . respectively perform different operations.

In step S1101, motion video segmenting device 100 performs a preliminary process for segmenting the sports video. The preliminary process is the process described in section 1.2.1 of Embodiment 1 described above.

In step S1102, motion video segmenting device 100 segments the motion video into a plurality of pieces using information acquired in the preliminary process in step S301 and performs a segmenting transmission process which is transmitted to the plurality of image processing devices 200.

[2.2.1 Segmenting Transmission Process]

Figure 12:
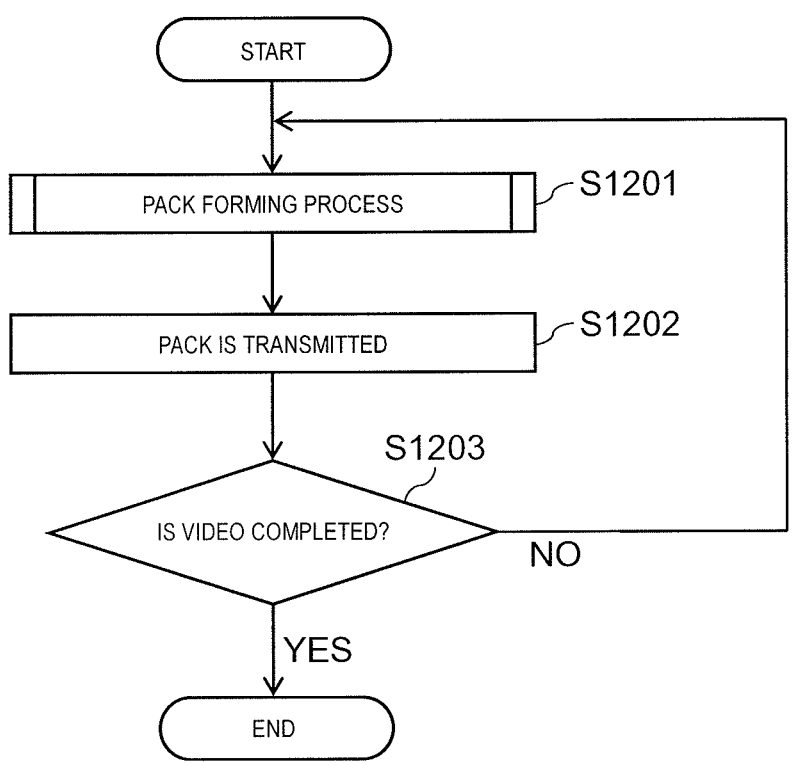
FIG. 12 is a flowchart for explaining an operation of the motion video segmenting device in a segmenting transmission process of Embodiment 2.

Hereinafter, details of the segmenting transmission process in Embodiment 2 will be described. FIG. 12 is a flowchart for explaining an operation of motion video segmenting device 100 in a segmenting transmission process of Embodiment 2.

In step S1201, motion video segmenting device 100 performs a pack forming process on the motion video photographed by camera 300. The pack forming process is the process described in the section 1.2.2.1 of Embodiment 1 described above.

In step S1202, motion video segmenting device 100 transmits a pack generated in step S1201 to all image processing devices 200X.

In step S1203, motion video segmenting device 100 determines whether or not the motion video is ended in the pack generated in step S1201. Here, the end of the motion video means that camera 300 stops photographing of the motion video due to, for example, the game of the sports event photographed by camera 300 is ended, or the like. In step S1203, in a case where it is determined that the motion video is ended (step S1203: Yes), the process is ended and otherwise (step S1203: No), the process returns to step S1201, and the next pack forming process is performed.

Returning to the explanation of FIG. 11. In step S1103, image processing device 200X performs an initial process on a plurality of the packs transmitted from motion video segmenting device 100. The initial process is a process of imparting the initial posture of the player to the still image of the start frame of the pack.

The process of imparting the initial posture to the image of the start frame of the pack is performed, for example, as follows. Image processing device 200X extracts a feature amount from the still image (hereinafter, referred to as a start image) of the start frame of the pack and detects a region corresponding to the player based on the feature amount. Image processing device 200X learns a position of a joint of the player by machine-learning another motion video of the sports event to be photographed in advance in motion video processing system 1, and a plurality of the positions of the joints are estimated from the region corresponding to the detected player. Image processing device 200X reduces the estimated positions of the joints to an appropriate number and, for example, selects an optimum combination of joints, for example, using a dynamic programming method. Image processing device 200X estimates the posture of the detected player based on the combination of the selected joints. Image processing device 200X performs the imparting of the initial posture on all players imaging on the start image.

Moreover, in the process of imparting of the initial posture described above, a feature amount extracted from the still image of the start frame of the pack may be a size of the foreground region which is the feature amount used in the difficulty degree determination process described above, or may adopt another feature amount.

In step S1104, image processing device 200X distributes the pack in which the initial process is completed in step S1103 to image processing device 200Y and image processing device 200Z including itself. For a distribution destination of each pack, image processing device 200X may determine, for example, as follows.

Here, as a premise, in Embodiment 2, in image processing device 200X and image processing device 200Y, the editing operation is performed by the corrector, but in image processing device 200Z, only automatic image analysis is assumed to be performed, so that it is assumed that no editing operation is performed by the corrector.

In consideration of such a premise, image processing device 200X refers the load value of each pack and one of image processing device 200X and image processing device 200Y is determined as the distribution destination for the pack of which the load value is a predetermined value or more. Image processing device 200X determines image processing device 200Z as the distribution destination for the pack of which the load value is less than the predetermined value. The number of correctors can be reduced by the amount of image processing device 200Z by adopting such a distribution method, so that an operation cost of motion video processing system 1 can be reduced.

In step S1105, image processing device 200X performs a tracking process and an edition acceptance process for the pack distributed in step S1104.

In step S1106, image processing device 200Y performs the tracking process and the edition acceptance process for the pack distributed in step S1104.

In step S1107, image processing device 200Z performs the tracking process for the pack distributed in step S1104.

In step S1108, image processing device 200X transmits a result (one reflecting the editing operation) of the tracking process in step S1105 to motion video processing system 1.

In step S1109, image processing device 200Y transmits a result (one reflecting the editing operation) of the tracking process in step S1106 to motion video processing system 1.

In step S1110, image processing device 200Z transmits a result of the tracking process in step S1107 to motion video processing system 1.

In step S1111, motion video segmenting device 100 joins results of the tracking processes in the segmented motion videos which are transmitted from image processing devices 200X, 200Y, and 200Z from step S1108 to step S1110, and generates a tracking result through the motion video.

[2.3 Effects Etc.]

As described above, in Embodiment 2, motion video processing system 1 includes motion video segmenting device 100, image processing device 200, and camera 300. Motion video segmenting device 100 determines the difficulty degree of the editing operation based on the difficulty degree of the image photographed by camera 300 and performs segmentation of the pack, so that the motion video is not segmented before and after the image of which the difficulty degree is high. Motion video segmenting device 100 transmits the formed pack to image processing device 200X, and image processing device 200X performs the initial process of imparting the posture to the player imaged on the image with respect to all the packs, and distributes the packs to the plurality of image processing devices 200 including itself. In this case, image processing device 200X distributes the pack of which the load value is a predetermined value or more to image processing device 200X or image processing device 200Y in which the corrector can perform the correction, and distributes the pack of which the load value is less than the predetermined value to image processing device 200X in which the correction is not performed by the corrector.

With such a configuration, the number of correctors of whole motion video processing system 1 can be reduced, so that the operation cost of motion video processing system 1 can be reduced.

Other Embodiments

As described above, the exemplary embodiments of technique disclosed in the present application are described. However, the technique of the disclosure is not limited to the embodiments described above, but can be applied to other embodiments in which change, replacement, addition, omission, and the like are performed. Further, it is also possible to combine each of the configuration elements described in the embodiments described above to form a new embodiment.

Hereinafter, other embodiments will be illustrated. In the embodiments described above, motion video segmenting device 100 sets the difficulty degree of the editing operation on the still image of each frame to two stages of High and Low. However, motion video segmenting device 100 may set the difficulty degree in the still image of each frame, for example, to multiple stages, that is, for example, five stages. In this case, in the subsequent process, for example, in step S606 illustrated in FIG. 6, or the like, instead of determining whether the difficulty degree is High or Low, it may be determined whether or not the difficulty degree is a predetermined stage or more.

In addition, in the embodiments described above, the feature amount is extracted from the image photographed by camera 300 and the difficulty degree of the editing operation is determined based on the feature amount. In the embodiments described above, for example, the rate occupied by the region corresponding to the player to the whole image is adopted as the feature amount.

However, the feature amount may be anything as long as it indicates the feature of the player in the image. That is, as a specific example of the feature amount, for example, a color, a luminance, a position of a vertex and a shape, or the like is provided. In addition, another known feature amount may be used as long as it indicates the feature of the player in the image.

In addition, in the embodiments described above, the difficulty degree is determined based on the rate of the foreground region included in the difficulty degree determination region (specific region). The difficulty degree determination region is a region that is predicted to be a lot of players set by the operator of motion video processing system 1, so that if the rate of the foreground region included in the difficulty degree determination region is high, it means that the players are densely populated in one place. However, in the disclosure, instead of determining the difficulty degree based on the rate of the foreground region included in the difficulty degree determination region (specific region), motion video segmenting device 100 may count the number of plays in the difficulty degree determination region and in a case where the number of players is large, it may be determined that the difficulty degree is higher than that of a case where the number of players is small. As a method of counting the number of players in the difficulty degree determination region, a technique of the related art may be used.

In addition, in the embodiments described above, as illustrated in FIG. 6 or the like, in a case where the image of the difficulty degree of Low continues predetermined value F_cnt or more, the motion video is segmented and the pack is formed on one image before the last image of the continuous images. However motion video processing system 1 of the disclosure may form the pack by another method. For example, in a case where motion video segmenting device 100 temporarily sets a predetermined number-th frame from the start frame as the end frame, and then the difficulty degree of the end frame is High, the pack may be formed by a resetting method in which a frame after the end frame is set as the end frame.

In addition, in the embodiments described above, motion video segmenting device 100 determines image processing device 200 that is the transmission destination based on the accumulation value of the load values of the pack previously transmitted to image processing device 200. However, for example, in a case where the time required for the editing operation varies depending on the corrector, in a final time of the game, or the like, it is conceivable that an unprocessed pack remains in each image processing device 200. In such a case, it is desirable that the transmission destination is set in consideration of a time required for a future editing operation rather than determining image processing device 200 of the transmission destination based on an accumulation load value so far.

Therefore, motion video segmenting device 100 calculates a sum value of the load values of the packs (unprocessed packs) which have already be transmitted and not notified of the completion of the process for each image processing device 200, and the transmission destination may be set based on the sum value. In this case, image processing device 200, which completes the tracking process and the edition acceptance process for one pack, notifies motion video segmenting device 100 of the completion thereof, and motion video segmenting device 100 may calculate the sum value of the load values of the unprocessed packs by subtracting the load value of the pack notified of the completion from the load value accumulation information described above.

In addition, in the embodiments described above, image processing device 200 transmits the tracking result listing the position of the player in each still image included in the pack to motion video segmenting device 100, and image processing device 200 generates the movement information of the player for one game by joining the tracking results received from the plurality of image processing devices 200. However, the information, which is transmitted by image processing device 200 to motion video segmenting device 100 to generate the movement information of the player for one game, is not limited to the format. The information, which is transmitted by image processing device 200 to motion video segmenting device 100, may be any information useful to generate the movement information of the player for one game. For example, image processing device 200 superimposes a marker indicating the position of the player or the like on each still image included in the pack to generate a position information addition pack, and the generated position information addition pack may be transmitted to motion video segmenting device 100. Even in this case, motion video segmenting device 100 can generate the movement information of the player for one game by joining the packs received from the plurality of image processing devices 200.

In addition, it is not necessary for motion video segmenting device 100 to join the tracking results or the position information addition packs generated by the plurality of image processing devices 200, and generate the movement information of the player for one game. For example, the plurality of image processing devices 200 may transmit the tracking results or the position information addition packs which are respectively generated to another motion video joining device, and the motion video joining device may join a plurality of the tracking results or the position information addition packs to generate the movement information of the player for one game. In this case, similar to motion video segmenting device 100 and image processing device 200 described above, the motion video joining device is configured by, for example, a computer such as a PC and a workstation.

In addition, in the embodiments described above, image processing device 200X and image processing device 200Y, the editing operation is performed by the corrector, but the disclosure is not limited thereto, and for example, the editing operation is performed by the corrector in image processing device 200Y, in image processing device 200X and image processing device 200Z, only automatic image analysis is performed, and no editing operation may be performed by the corrector. In this case, the editing operation can be divided among correctors for each editing content, such as, the corrector of image processing device 200X performs confirmation and correction of processing of imparting the initial posture, and the corrector of image processing device 200Y performs the confirmation and correction of the tracking process.

In addition, in the embodiments described above, a plurality of image processing devices 200A, 200B, 200C, 200X, 200Y, and 200Z, and the like are described as having the same configuration. However, in Embodiment 2, with respect to image processing device 200Z in which the corrector does not perform the correction operation, for example, there may be a difference in the configuration such as not having input unit 203 or display unit 204.

In addition, in the embodiments described above, motion video segmenting device 100 and image processing device 200 are described as different configurations. However, for example, a function of motion video segmenting device 100 and a function of image processing device 200 may be mounted on a computer such as a small number of PCs or workstations. In such a case, the functions of motion video segmenting device 100 and the plurality of image processing devices 200 can be realized by, for example, a very small number of computers such as one computer by preparing the display unit and the input unit for performing the correction operation for the number of correctors. Therefore, an installation cost of motion video processing system 1 can be reduced.

Moreover, since the embodiments described above are intended to exemplify the technique in the disclosure, various modifications, replacements, additions, omissions, or the like may be performed within the scope of claims or the equivalent thereof. For example, in the embodiments described above, as an example of the motion video, an example, in which the motion video configuring the sports video obtained by photographing the game of the sports event is used, is described. However, the motion video used in the disclosure is not limited to the motion video configuring the sports video obtained by photographing the game of the sports event. The motion video used in the disclosure may include all the motion videos to be analyzed widely. An example of the motion video to be analyzed includes a motion video recording a behavior of a person. In a case where the disclosure is applied to the motion video recording the behavior of the person, if there are many persons who are present in a specific region in the image configuring the motion video, it is determined that the difficulty degree is higher than that of a case where there are a few persons who are present in the specific region. In addition, a motion video recording a concert image of a pop star is included in the motion video used in the disclosure. In a case where the disclosure is applied to the motion video recording the concert image of the pop star, if there are many pop stars who are present in a specific region in the image configuring the motion video, it is determined that the difficulty degree is higher than that of a case where there are a few pop stars who are present in the specific region.

INDUSTRIAL APPLICABILITY

The disclosure can be applied to the motion video segmenting method, the motion video segmenting device, and the motion video processing system that segment the motion video.

REFERENCE MARKS IN THE DRAWINGS

1 MOTION VIDEO PROCESSING SYSTEM
100 MOTION VIDEO SEGMENTING DEVICE
101 PROCESSOR
102 STORAGE UNIT
103 INPUT UNIT
104 DISPLAY UNIT
105 COMMUNICATION UNIT
106 BUS
200, 200A. 200B. 200C. 200X. 200Y, 200Z IMAGE PROCESSING DEVICE
201 PROCESSOR
202 STORAGE UNIT
203 INPUT UNIT
204 DISPLAY UNIT
205 COMMUNICATION UNIT
206 BUS
300 CAMERA
400 FIELD
401, 402 REGION
1001, 1002, 1003, 1004 TABLE

The invention claimed is:

1. A motion video segmenting method comprising:
   determining, by a processor, a number of objects present in each image of a plurality of frames configuring a motion video, the number of objects corresponding to a difficulty degree in performing an editing operation;
   determining, by the processor, a place at which images of the plurality of frames configuring the motion video are to be segmented into a plurality of groups based on the determined number of objects present in each image of the plurality of frames configuring the motion video, so that a number of objects present in an image of a start frame and/or an end frame in a segmented group is smaller than a predetermined value; and
   segmenting, at the determined place by the processor, the images of the plurality of frames configuring the motion video into the plurality of groups based on the number of objects present in each image of the plurality of frames configuring the motion video.

2. The motion video segmenting method of claim 1, wherein the processor determines the place at which the images of the plurality of frames configuring the motion video are segmented into the plurality of groups, so that the image of the end frame in the segmented group and an image of a start frame in another segmented group overlap.

3. The motion video segmenting method of claim 1, wherein the processor
determines the place at which the images of the plurality of frames configuring the motion video are segmented into the plurality of groups, so that a number of objects present in each of the images of the plurality of frames up to the end frame inclusive in the segmented group are smaller than the predetermined value.

4. The motion video segmenting method of claim 1, wherein the processor
determines the place at which the images of the plurality of frames configuring the motion video are segmented into the plurality of groups, so that in a case where a frame after a predetermined number of frames from a first frame forming a group is set as the end frame, and the number of objects present in the image of the end frame is larger than the predetermined value, a frame after the end frame is set as a new end frame, and thereby the number of objects present in the image of the end frame in the segmented group is smaller than the predetermined value.

5. The motion video segmenting method of claim 4, wherein the processor
does not set the new end frame in a case where the number of frames forming the group exceeds a predetermined value even in a case where the number of objects present in the image of the end frame is larger than the predetermined value.

6. The motion video segmenting method of claim 1, wherein the processor
determines an image processing device to be a transmission destination of segmented one group based on a number of objects present in an image configuring the segmented one group.

7. The motion video segmenting method of claim 1, wherein the processor
determines an image processing device to be a transmission destination of segmented one group based on a size of a number of frames of the image configuring the segmented one group.

8. The motion video segmenting method of claim 1, wherein the difficulty degree is further determined based on a rate of a size of a foreground region included in a predetermined specific region of the image to a size of the foreground region of each of images of the plurality of frames, the foreground region being a region other than a background included in images of each frame, and
wherein, in a case where the rate of the size of the foreground region is larger than a predetermined rate, the difficulty degree is determined to be higher than that in a case where the rate of the size of the foreground region is smaller than the predetermined rate.

9. The motion video segmenting method of claim 1, wherein the motion video is a motion video configuring a sports video obtained by photographing a game of a sports event, and
wherein the processor determines that if many players are present in a specific region in images configuring the motion video, the difficulty degree is higher than that in a case where a few players are present in the specific region.

10. The motion video segmenting method of claim 1, wherein the number of objects refers to a number of players.

11. The motion video segmenting method of claim 1, wherein the number of objects refers to objects present in a foreground region of the image and does not account a background region of the image.

12. The motion video segmenting method of claim 1, wherein the motion video is not segmented at a frame when the number of object included in an image of the frame is larger than the predetermined value.

13. A motion video segmenting device comprising a processor,
wherein the processor
determines a number of objects present in each image of a plurality of frames configuring a motion video, the number of objects corresponding to a difficulty degree in performing an editing operation,
determines a place at which images of the plurality of frames configuring the motion video are to be segmented into a plurality of groups based on the determined number of objects present in each image of the plurality of frames configuring the motion video, so that a number of objects present in an image of a start frame and/or an end frame in the segmented group is smaller than a predetermined value, and
segments, at the determined place, the images of the plurality of frames configuring the motion video into the plurality of groups based on the number of objects present in each image of the plurality of frames configuring the motion video.

14. The motion video segmenting device of claim 13, wherein the processor
determines an image processing device to be a transmission destination of segmented one group based on a number of objects present in an image configuring the segmented one group.

15. The motion video segmenting device of claim 13, wherein the processor
determines an image processing device to be a transmission destination of segmented one group based on a size of a number of frames of the image configuring the segmented one group.

16. A motion video processing system comprising a motion video segmenting device having a processor and a plurality of image processing devices which perform predetermined processing on a motion video transmitted by the motion video segmenting device,
wherein the processor
determines a number of objects present in each image of a plurality of frames configuring a motion video, the number of objects corresponding to a difficulty degree in performing an editing operation,
determines a place at which images of the plurality of frames configuring the motion video are to be segmented into a plurality of groups based on the determined number of objects present in each image of the plurality of frames configuring the motion video, so that a number of objects present in an image of a start frame and/or an end frame in the segmented group is smaller than a predetermined value,
segments, at the determined place, the images of the plurality of frames configuring the motion video into the plurality of groups based on the number of objects present in each image of the plurality of frames configuring the motion video, and
determines an image processing device to be a transmission destination of the segmented one group in the plurality of the image processing devices based on the difficulty degree of image configuring the segmented one group.

\* \* \* \* \*